US012654270B2

(12) United States Patent
Nakajima et al.

(10) Patent No.: US 12,654,270 B2
(45) Date of Patent: Jun. 16, 2026

(54) FEED APPARATUS

(71) Applicant: DMG MORI CO., LTD., Nara (JP)

(72) Inventors: Yoshihiko Nakajima, Nara (JP);
Shinya Kidani, Nara (JP)

(73) Assignee: DMG MORI CO., LTD., Nara (JP)

( * ) Notice: Subject to any disclaimer, the term of this
patent is extended or adjusted under 35
U.S.C. 154(b) by 517 days.

(21) Appl. No.: 18/038,929

(22) PCT Filed: Dec. 10, 2020

(86) PCT No.: PCT/JP2020/045967
§ 371 (c)(1),
(2) Date: May 25, 2023

(87) PCT Pub. No.: WO2022/123711
PCT Pub. Date: Jun. 16, 2022

(65) Prior Publication Data
US 2024/0017365 A1 Jan. 18, 2024

(51) Int. Cl.
*B23Q 5/34* (2006.01)
(52) U.S. Cl.
CPC ...................................... *B23Q 5/34* (2013.01)
(58) Field of Classification Search
CPC . B23Q 5/34; B23Q 1/58; B23Q 17/22; G05B
19/401
See application file for complete search history.

(56) References Cited

U.S. PATENT DOCUMENTS

| 2007/0152391 A1* | 7/2007 | Chitayat | ................... B23Q 1/58 269/55 |
| 2014/0204392 A1 | 7/2014 | Lee et al. | |
| 2018/0313671 A1* | 11/2018 | Niiya | ................. G01D 5/34715 |

(Continued)

FOREIGN PATENT DOCUMENTS

| CN | 104439570 A | 3/2015 |
| JP | 2007331086 A | 12/2007 |
| JP | 2012045703 A | 3/2012 |

(Continued)

OTHER PUBLICATIONS

International Search Report for related Application No. PCT/JP2020/045967; report dated Mar. 2, 2021.

(Continued)

*Primary Examiner* — Tarifur R Chowdhury
*Assistant Examiner* — Carlos Perez-Guzman

(57) ABSTRACT

The present invention includes two guide rails (15, 16) arranged in parallel in a feeding direction, sliders (17, 19, 21, 23) arranged on the guide rails (15, 16), a movable carriage (3) mounted on the sliders (17, 19, 21, 23) and moved in the feeding direction, and a drive mechanism (11) moving the movable carriage (3). The present invention further includes a scale arranged along the feeding direction on the guide rails (15, 16), read heads (18, 20, 22, 24) respectively arranged on the sliders (17, 19, 21, 23) and detecting a position in the feeding direction and a position in a direction orthogonal to the feeding direction by reading information given to the scale, and a motion error calculator (70) calculating a motion error of the movable carriage (3) based on position information in two directions detected by the read heads (18, 20, 22, 24).

10 Claims, 6 Drawing Sheets

(56)           References Cited

U.S. PATENT DOCUMENTS

2019/0383327 A1* 12/2019 Unno ................... G05B 19/402
2020/0018595 A1    1/2020 Huang

FOREIGN PATENT DOCUMENTS

| JP | 2012518167 A | 8/2012 |
|----|--------------|--------|
| JP | 5172265 B2 | 3/2013 |
| JP | 2015166114 A | 9/2015 |
| JP | 2018120359 A | 8/2018 |
| JP | 2019206043 A | 12/2019 |
| WO | 2005111754 A1 | 11/2005 |
| WO | 2009069423 A1 | 6/2009 |

OTHER PUBLICATIONS

Extended European Search Report for related Application No. EP20965094.4; reported on Jul. 5, 2024.

\* cited by examiner

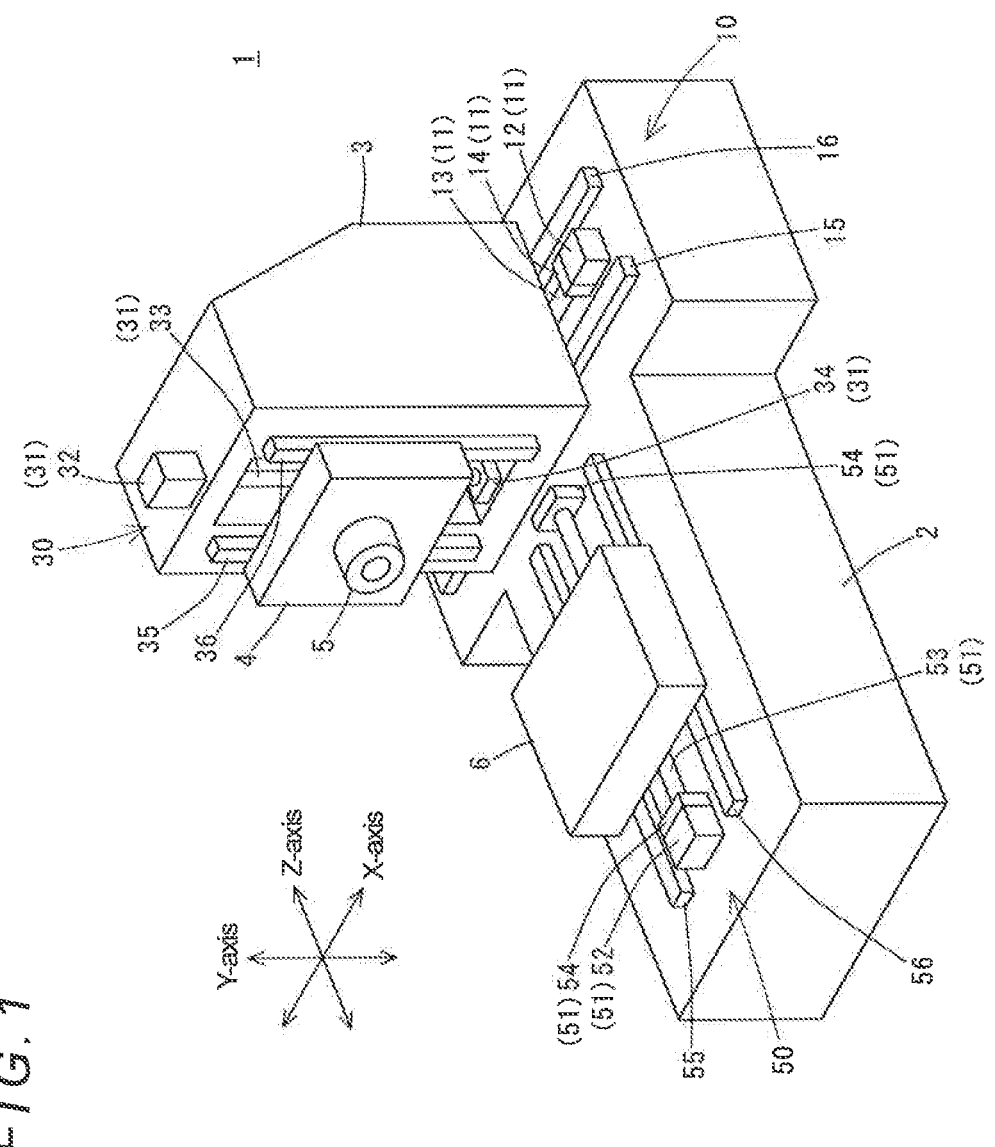
F I G . 1

FEED APPARATUS

TECHNICAL FIELD

The present invention relates to a feeding device constituting a linear feed axis, and particularly relates to a feeding device which is capable of measuring its own motion error.

BACKGROUND ART

For example, a machine tool is conventionally known which is configured to relatively move a spindle for holding a tool and a table for placing a workpiece thereon in the directions of three orthogonal axes, namely, an X-axis, a Y-axis, and a Z-axis. This machine tool includes three feeding devices, namely, an X-axis feeding device that constitutes a feed axis in the X-axis direction, a Y-axis feeding device that constitutes a feed axis in the Y-axis direction, and a Z-axis feeding device that constitutes a feed axis in the Z-axis direction. The machining accuracy in the thus-configured machine tool depends on the motion accuracy of the feeding devices; therefore, it is necessary to accurately measure motion errors of the feeding devices to make an appropriate correction or the like so that the motion errors each fall within an allowable range.

In recent years, a motion error (positioning error) in a three-dimensional space in a machine tool has been considered to occur with errors in translational motions in the feed axes, angular errors in the feed axes, and errors regarding the perpendicularity between the feed axes interacting with one another as illustrated in FIG. 5. Therefore, obtaining these errors enables the motion error to be accurately identified.

To measure these errors, a measurement method using a measurement apparatus as illustrated in FIGS. 6 and 7 has been proposed. An example machine tool 100 illustrated in FIG. 6 is constituted by a bed 101 having a workpiece placement surface (i.e., a table) on the top thereof, a portal frame 102, and a saddle 103. The frame 102 is arranged such that the horizontal portion thereof is positioned above the bed 101. The two vertical portions of the frame 102 are engaged with the sides of the bed 101 such that the frame 102 as a whole is movable in the Y-axis direction.

The saddle 103 is engaged with the horizontal portion of the frame 102 to be movable in the X-axis direction along the horizontal portion of the frame 102. The saddle 103 holds a spindle 104 such that the spindle 104 is movable in the Z-axis direction and rotatable about an axis parallel to the Z-axis. The X-axis, the Y-axis, and the Z-axis are mutually orthogonal reference axes, and feed axes corresponding to these reference axes are respectively constituted by an X-axis feeding device (not illustrated), a Y-axis feeding device (not illustrated), and a Z-axis feeding device (not illustrated).

The above-mentioned errors are measured using laser length measurement devices 105 installed on the bed 101 as well as a mirror 110 attached to the spindle 104. Specifically, first, the laser length measurement devices 105 are respectively installed at predetermined positions, for example, at the four positions indicated by the solid lines in FIG. 6, and the mirror 110 is attached to the spindle 104. Subsequently, positioning in each of the X-axis feeding device, Y-axis feeding device, and Z-axis feeding device is controlled at regular intervals so that the mirror 110 is positioned at each grid point of a regular grid dividing a three-dimensional space. At each grid point, each laser length measurement device 105 radiates a laser beam toward the mirror 110 and receives a reflected light of the laser beam, thereby measuring the distance to the mirror 110.

Based on the measurement data obtained in the above-described manner, the position of the mirror 110 at each grid point in the three-dimensional space is calculated in accordance with the principle of triangulation. Based on the calculated position data and analysis of the position data, the above-mentioned errors are calculated.

Note that the laser length measurement devices 105 are each configured to be able to turn a laser interferometer 107 about the center of a reference sphere 106 as illustrated in FIG. 7 and configured to be able to automatically track the mirror 110 by turning the laser interferometer 107 in accordance with movement of the mirror 110.

However, the thus-configured laser length measurement device 105 is very expensive, therefore, it is impractical to use four laser length measurement devices 105 in the above-described measurement. Accordingly, conventionally, the measurement is carried out using a single laser length measurement device 105 as follows: the single laser length measurement device 105 is sequentially moved to and installed on four positions and, at each of the positions, the mirror 110 is positioned at each grid point of the grid and the distance between the laser length measurement device 105 and the mirror 110 at each grid point is measured.

This motion error measurement using a single laser length measurement device 105 reduces the costs associated with the laser length measurement device 105. However, this measurement requires long time and is complicated and burdensome because the operation of positioning the mirror 110 at each grid point has to be carried out each time the laser length measurement device 105 is installed on a different position. By simple arithmetic, the time needed for the measurement using a single laser length measurement device 105 is four times longer than the time needed for the measurement using four laser length measurement devices 105.

In view of these circumstances, in Patent Literature 1 listed below, the applicant has proposed a motion error identification method that is capable of identifying a motion error by carrying out a single operation using a single laser length measurement device.

CITATION LIST

Patent Literature

Patent Literature 1: Japanese Unexamined Patent Application Publication No. 2019-206043

SUMMARY OF INVENTION

Technical Problem

In the field of machine tools, in recent years, the feeding device as described above uses a high-accuracy scale, such as a magnetic scale or an optical scale, so that the feeding device can be controlled with high accuracy.

Therefore, if the motion error of the feeding device can be measured using the scale already existing in the feeding device without additionally preparing an expensive measurement device like the above-described laser length measurement device 105, the motion error of the feeding device will be measured with high accuracy without extra costs and without requiring a complicated and burdensome preparing operation for the measurement, which is beneficial.

Further, even in the case where it is impossible to detect all of the above-mentioned errors in the machine tool, i.e., the errors in translational motions in the feed axes, the angular errors in the feed axes, and the errors regarding the perpendicularity between the feed axes, if a bare minimum of motion errors are easily detected, it is possible to evaluate the running performance of the machine tool, which changes with time, at an appropriate time without greatly reducing the availability of the machine tool. Consequently, it is possible to take a necessary action, such as performing needed maintenance on the machine tool, in advance in accordance with the evaluation results obtained.

The present invention has been achieved in view of the above-described circumstances, and an object of the invention is to provide a feeding device which is capable of efficiently measuring its own motion error in a short time.

Solution to Problem

To solve the above-described problem, the present invention provides a feeding device including:

two guide rails arranged in parallel along a predetermined feeding direction;

at least four sliders arranged at least two by two on the two guide rails and engaged with the guide rails to be movable along the feeding direction;

a movable carriage mounted on the sliders and configured to be moved in the feeding direction; and a drive mechanism configured to move the movable carriage in the feeding direction, wherein:

the feeding device includes:

a scale arranged along the feeding direction on at least one of the guide rails;

read heads respectively arranged on at least two sliders selected from the at least four sliders and engaged with the guide rail having the scale arranged thereon, the read heads being configured to detect a position in the feeding direction and a position in a direction orthogonal to the feeding direction by reading information given to the scale; and a motion error calculator configured to calculate a motion error of the movable carriage based on position information in two directions detected by the read heads.

In the feeding device according to this aspect (first aspect), the movable carriage is moved in the feeding direction through the engagement between the guide rails and the sliders by being driven by the drive mechanism. When the movable carriage has been moved by a predetermined distance, the motion error calculator calculates a motion error of the movable carriage based on position information in two directions detected by the read heads arranged on the at least two sliders.

Thus, with this feeding device, the motion error of the feeding device is measured using the scale already existing in the feeding device instead of using an expensive measurement device like the above-described laser length measurement device; therefore, the motion error of the feeding device is measured with high accuracy without extra costs and without requiring a complicated and burdensome preparing operation for the measurement.

Further, since the motion performance of the feeding device is easily detected, it is possible to evaluate the running performance of a machine tool, which changes with time, at an appropriate time without greatly reducing the availability of the machine tool. Consequently, it is possible to take a necessary action, such as performing needed maintenance on the machine tool, in advance in accordance with the evaluation results obtained.

In the feeding device according to the first aspect, appropriately determining the guide rail on which the scale is to be arranged and the sliders on which the read heads are to be arranged enables the motion error calculator to derive various motion errors of the feeding device in addition to a straight-line positioning error in the feeding direction.

For example, the feeding device according to the first aspect may be configured according to the following aspect (second aspect):

the scale is arranged on each of the two guide rails and the read heads are respectively arranged on the four sliders; and the motion error calculator is configured to calculate a motion error of the movable carriage based on position information in two directions detected by the four read heads.

Further, the feeding device according to this second aspect may be configured according to the following aspect (third aspect):

two read heads arranged on at least one of the guide rails are configured to detect a position in a direction of a first axis as the feeding direction and a position in a direction of a second axis orthogonal to the first axis in a plane including the two guide rails; and two read heads arranged on another one of the guide rails are configured to detect a position in the direction of the first axis and a position in a direction of a third axis orthogonal to both the first axis and the second axis.

Alternatively, the feeding device according to the second aspect may be configured according to the following aspect (fourth aspect):

one of two read heads arranged on at least one of the guide rails is configured to detect a position in a direction of a first axis as the feeding direction and a position in a direction of a second axis orthogonal to the first axis in a plane including the two guide rails;

another one of the two read heads is configured to detect a position in the direction of the first axis and a position in a direction of a third axis orthogonal to both the first axis and the second axis; and two read heads arranged on another one of the guide rails are configured to detect a position in the direction of the first axis and a position in the direction of the third axis.

Further, the feeding devices according to the third aspect and the fourth aspect may be configured according to the following aspect (fifth aspect):

the motion error calculator is configured to calculate a positioning error (straight-line positioning accuracy) in the direction of the first axis and at least one selected from among a straightness error (straightness) in the direction of the second axis in a plane defined by the first axis and the second axis, a straightness error (straightness) in the direction of the third axis in a plane defined by the first axis and the third axis, an angular error (roll) around the first axis, an angular error (pitch) around the second axis, and an angular error (yaw) around the third axis.

The present invention further provides a machine tool including any one of the feeding devices according to the first aspect to the fifth aspect.

Advantageous Effects of Invention

With the feeding device according to the present invention, the motion error of the feeding device is measured using the scale already existing in the feeding device instead of using an expensive measurement device like the above-described laser length measurement device; therefore, the motion error of the feeding device is measured with high accuracy without extra costs and without requiring a complicated and burdensome preparing operation for the measurement.

Further, since the motion performance of the feeding device is easily detected, it is possible to evaluate the running performance of a machine tool, which changes with time, at an appropriate time without greatly reducing the availability of the machine tool. Consequently, it is possible to take a necessary action, such as performing needed maintenance on the machine tool, in advance in accordance with the evaluation results obtained.

BRIEF DESCRIPTION OF DRAWINGS

FIG. 1 is a perspective view illustrating a machine tool according to an embodiment of the present invention;

Figure 5:
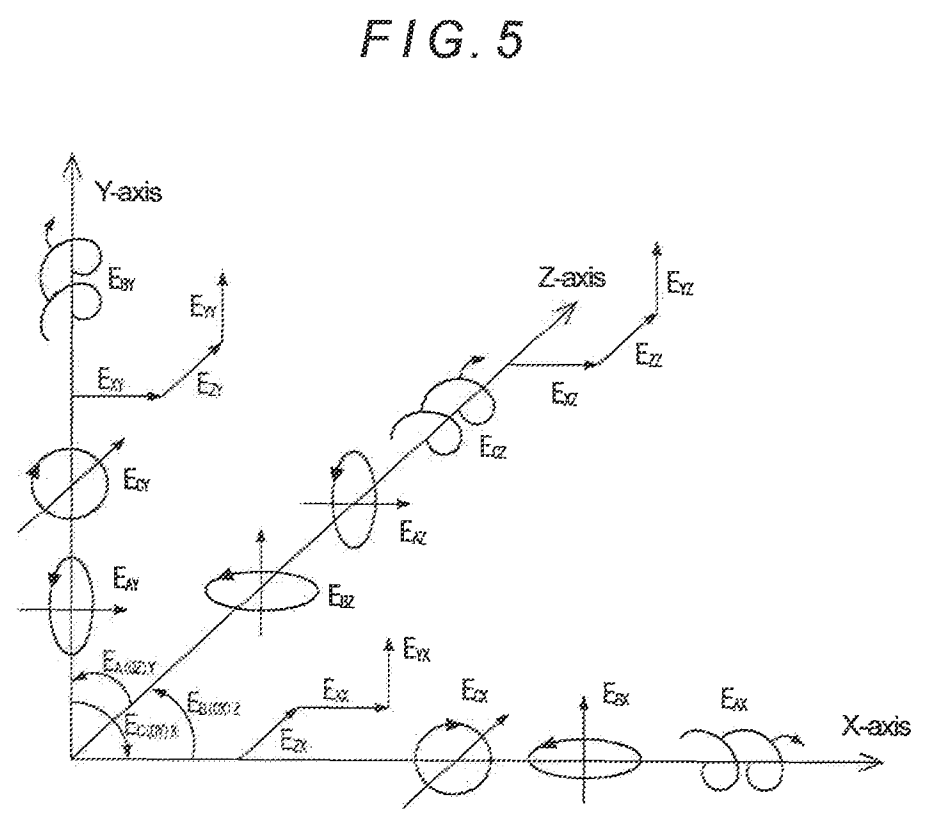

FIG. 5 is an illustrative diagram for explaining a motion error in a machine tool having feeding devices in three orthogonal axis directions;

DESCRIPTION OF EMBODIMENTS

Figure 2:
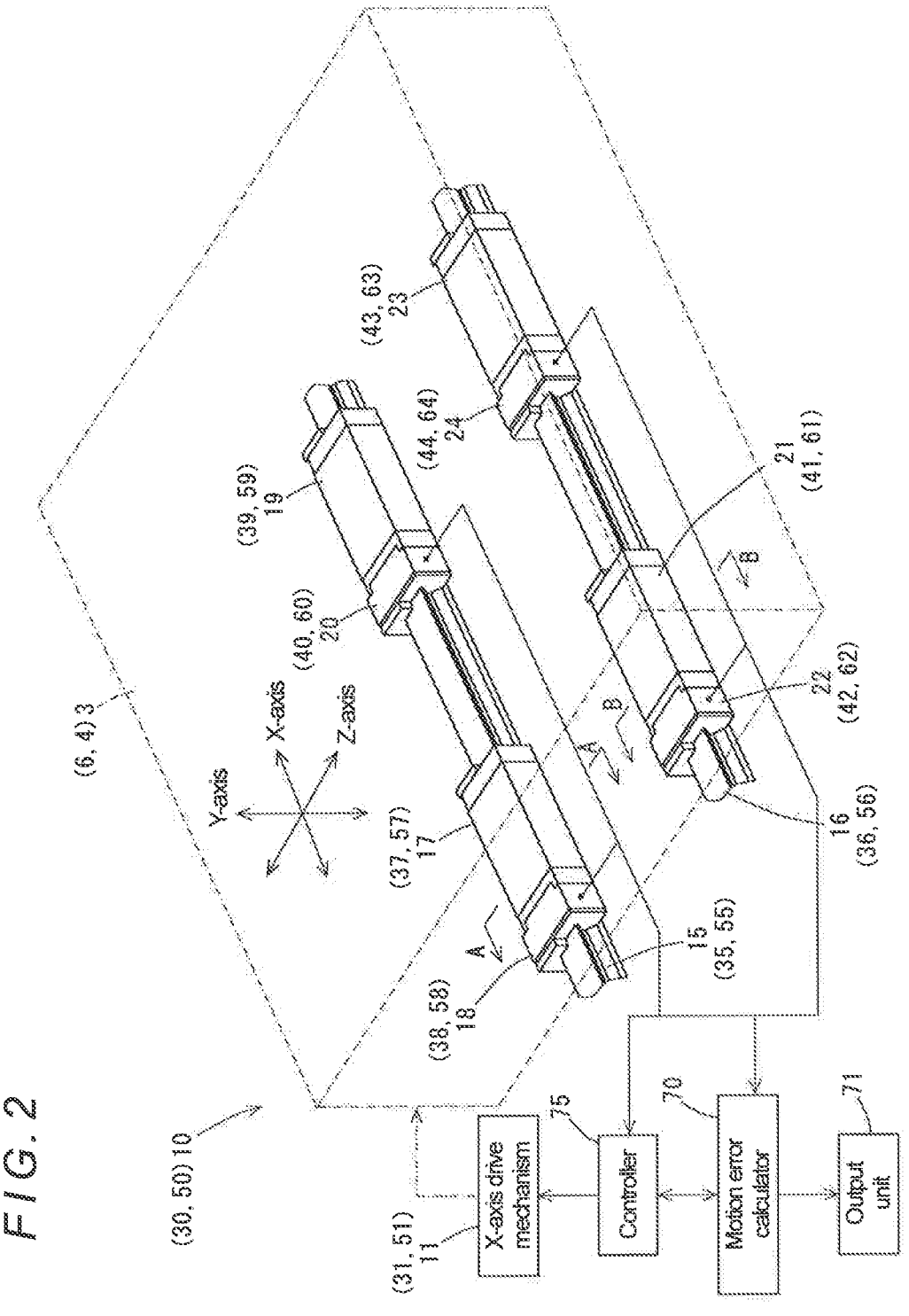
FIG. 2 is an illustrative diagram schematically illustrating a configuration of a feeding device according to the embodiment.

Hereinafter, a specific embodiment of the present invention will be described with reference to the drawings.

First of all, a schematic configuration of a machine tool 1 according to this embodiment is described. As illustrated in FIG. 1, the machine tool 1 according to this embodiment includes a bed 2 having a T-shape in plan view, a column 3 arranged on one portion of the bed 2, a table 6 arranged on the other portion of the bed 2, a saddle 4 arranged on a side surface (front surface) located on the table 6 side of the column 3, a spindle 5 rotatably supported by the saddle 4, a spindle motor (not illustrated) rotating the spindle 5, an X-axis feed unit 10 moving the column 3 along an X-axis that is indicated by an arrow, a Y-axis feed unit 30 moving the saddle 4 along a Y-axis that is indicated by an arrow, and a Z-axis feed unit 50 moving the table 6 along a Z-axis that is indicated by an arrow. Note that the X-axis, the Y-axis, and the Z-axis are mutually orthogonal reference axes.

Further, as illustrated in FIG. 2, the machine tool 1 includes a motion error calculator 70, an output unit 71, and a controller 75 as well as the above-described elements. In this embodiment, the X-axis feed unit 10, the Y-axis feed unit 30, the Z-axis feed unit 50, the column 3, the saddle 4, the table 6, the motion error calculator 70, and the output unit 71 constitute one feeding device. These elements are described in detail below.

Figure 3:
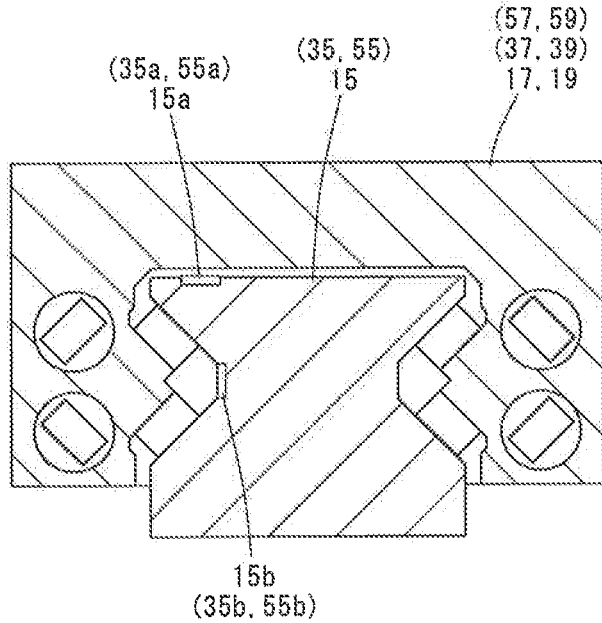
FIG. 3 is a sectional view taken along line A-A in FIG. 2 showing a guide rail, a slider, and scales in the embodiment.
Figure 4:
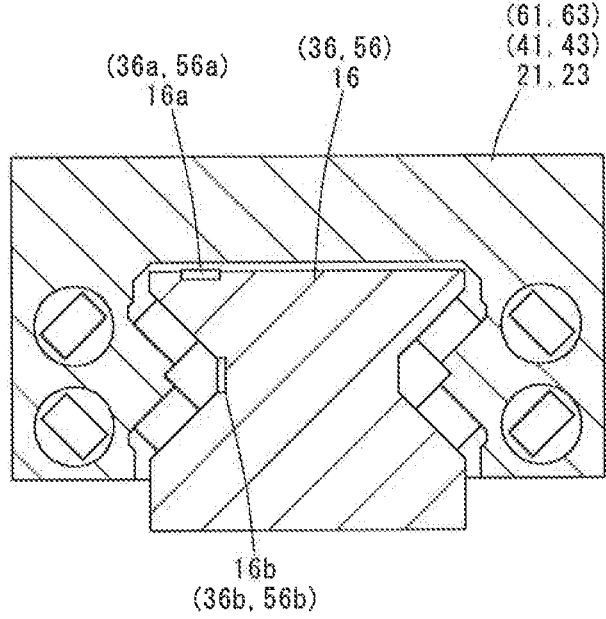
FIG. 4 is a sectional view taken along line B-B in FIG. 2 showing a guide rail, a slider, and scales in the embodiment.
Figure 6:
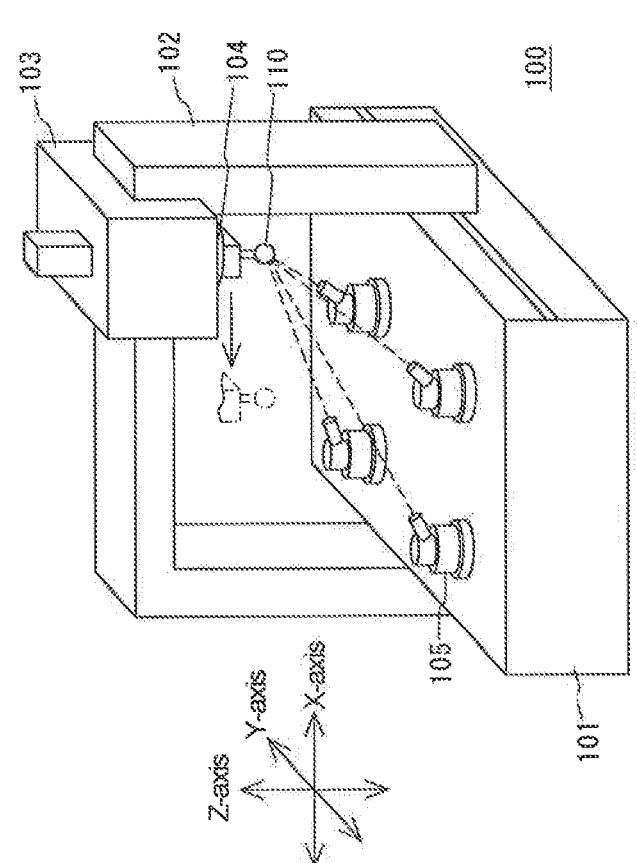
FIG. 6 is an illustrative diagram for explaining the conventional motion error measurement methods.
Figure 7:
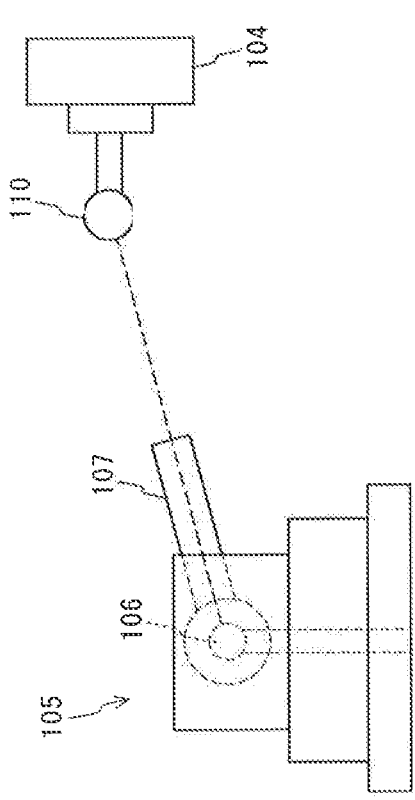
FIG. 7 is an illustrative diagram for explaining the conventional motion error measurement methods.

First, the X-axis feed unit 10, the Y-axis feed unit 30, and the Z-axis feed unit 50 as motion mechanism units are described. Note that FIGS. 2 and 3 illustrate the X-axis feed unit 10 as a representative one of the feed units. The Y-axis feed unit 30 and the Z-axis feed unit 50 each have the same configuration as the X-axis feed unit 10 and the same components of them are denoted by reference numerals in parentheses in FIGS. 2 and 3.

[X-Axis Feed Unit]

The X-axis feed unit 10 includes a pair of guide rails 15 and 16 arranged in parallel along the X-axis on the bed 2, two sliders 17 and 19 engaged with the guide rail 15 to be movable along the guide rail 15, a scale 15a fixed to a top surface of the guide rail 15 along the guide rail 15, a scale 15b fixed to a side surface of the guide rail 15 along the guide rail 15, read heads 18 and 20 respectively fixed to the sliders 17 and 19, two sliders 21 and 23 engaged with the guide rail 16 to be movable along the guide rail 16, a scale 16a fixed to a top surface of the guide rail 16 along the guide rail 16, a scale 16b fixed to a side surface of the guide rail 16 along the guide rail 16, read heads 22 and 24 respectively fixed to the sliders 21 and 23, and an X-axis drive mechanism 11 driving the column 3.

The scales 15a and 15b and the read heads 18 and 20 constitute a set of linear encoders, and the scales 16a and 16b and the read heads 22 and 24 constitute another set of linear encoders. These linear encoders can be composed of magnetic linear encoders or optical linear encoders. The linear encoders in this embodiment are composed of magnetic linear encoders. The read heads 18 and 20 detect positions in the X-axis direction of the sliders 17 and 19 and displacement in the Y-axis direction and the Z-axis direction of the sliders 17 and 19 by reading the scales 15a and 15b. The read heads 22 and 24 detect positions in the X-axis direction of the sliders 21 and 23 and displacement in the Y-axis direction and the Z-axis direction of the sliders 21 and 23 by reading the scales 16a and 16b.

The X-axis drive mechanism 11 includes an X-axis feed motor 12 composed of a servo motor, a ball screw 13 to be driven by the X-axis feed motor 12, a ball nut (not illustrated) screwed on the ball screw 13 and fixed to a bottom surface of the column 3, and bearings 14 (one of which is not shown in the drawings) supporting the ends of the ball screw 13 such that the ball screw 13 is rotatable. The X-axis feed mechanism 11 drives the X-axis feed motor 12 to rotate the ball screw 13, whereby the column 3 is moved along the X-axis while being guided by the guide rails 15 and 16.

[Y-Axis Feed Unit]

The Y-axis feed unit 30 includes a pair of guide rails 35 and 36 arranged in parallel along the Y-axis on the front surface of the column 3, two sliders 37 and 39 engaged with the guide rail 35 to be movable along the guide rail 35, a scale 35a fixed to a top surface of the guide rail 35 along the guide rail 35, a scale 35b fixed to a side surface of the guide rail 35 along the guide rail 35, read heads 38 and 40 respectively fixed to the sliders 37 and 39, two sliders 41 and 43 engaged with the guide rail 36 to be movable along the guide rail 36, a scale 36a fixed to a top surface of the guide rail 36 along the guide rail 36, a scale 36b fixed to a side surface of the guide rail 36 along the guide rail 36, read heads 42 and 44 respectively fixed to the sliders 41 and 43, and a Y-axis drive mechanism 31 driving the column 3.

The scales 35a and 35b and the read heads 38 and 40 constitute a set of linear encoders, and the scales 36a and 36b and the read heads 42 and 44 constitute another set of linear encoders. These linear encoders also can be composed of magnetic linear encoders or optical linear encoders. The linear encoders in this embodiment are composed of magnetic linear encoders. The read heads 38 and 40 detect positions in the Y-axis direction of the sliders 37 and 39 and displacement in the Z-axis direction and the X-axis direction of the sliders 37 and 39 by reading the scales 35a and 35b. The read heads 42 and 44 detect positions in the Y-axis direction of the sliders 41 and 43 and displacement in the Z-axis direction and the X-axis direction of the sliders 41 and 43 by reading the scales 36a and 36b.

The Y-axis drive mechanism 31 includes a Y-axis feed motor 32 composed of a servo motor, a ball screw 33 to be driven by the Y-axis feed motor 32, a ball nut (not illustrated) screwed on the ball screw 33 and fixed to a rear surface of the saddle 4, and bearings 34 (one of which is not shown in the drawings) supporting the ends of the ball screw 33 such that the ball screw 33 is rotatable. The Y-axis feed mechanism 31 drives the Y-axis feed motor 32 to rotate the ball screw 33, whereby the saddle 4 is moved along the Y-axis while being guided by the guide rails 35 and 36.

[Z-Axis Feed Unit]

The Z-axis feed unit 50 includes a pair of guide rails 55 and 56 arranged in parallel along the Z-axis on the bed 2, two sliders 57 and 59 engaged with the guide rail 55 to be movable along the guide rail 55, a scale 55a fixed to a top surface of the guide rail 55 along the guide rail 55, a scale 55b fixed to a side surface of the guide rail 55 along the guide rail 55, read heads 58 and 60 respectively fixed to the sliders 57 and 59, two sliders 61 and 63 engaged with the guide rail 56 to be movable along the guide rail 56, a scale 56a fixed to a top surface of the guide rail 56 along the guide rail 56, a scale 56b fixed to a side surface of the guide rail 56 along the guide rail 56, read heads 62 and 64 respectively fixed to the sliders 61 and 63, and a Z-axis drive mechanism 51 driving the table 6.

The scales 55a and 55b and the read heads 58 and 60 constitute a set of linear encoders, and the scales 56a and 56b and the read heads 62 and 64 constitute another set of linear encoders. These linear encoders also can be composed of magnetic linear encoders or optical linear encoders. The linear encoders in this embodiment are composed of magnetic linear encoders. The read heads 58 and 60 detect positions in the Z-axis direction of the sliders 57 and 59 and displacement in the Y-axis direction and the X-axis direction of the sliders 57 and 59 by reading the scales 55a and 55b. The read heads 62 and 64 detect positions in the Z-axis direction of the sliders 61 and 63 and displacement in the Y-axis direction and the X-axis direction of the sliders 61 and 63 by reading the scales 56a and 56b.

The Z-axis drive mechanism 51 includes a Z-axis feed motor 52 composed of a servo motor, a ball screw 53 to be driven by the Z-axis feed motor 52, a ball nut (not illustrated) screwed on the ball screw 53 and fixed to a bottom surface of the table 6, and bearings 54 (one of which is not shown in the drawings) supporting the ends of the ball screw 53 such that the ball screw 53 is rotatable. The Z-axis feed mechanism 51 drives the Z-axis feed motor 52 to rotate the ball screw 53, whereby the table 6 is moved along the Z-axis while being guided by the guide rails 55 and 56.

Next, the motion error calculator 70, the output unit 71, and the controller 75 are described. Note that the motion error calculator 70 and the controller 75 are composed of a computer including a CPU, a RAM, and a ROM.

[Controller]

The controller 75 is of a well-known type that numerically controls operations of the spindle motor (not illustrated), X-axis feed motor 12, Y-axis feed motor 32, Z-axis feed motor 52, and other elements. Further, the controller 75 performs a control operation of driving the X-axis feed motor 12, the Y-axis feed motor 32, and the Z-axis feed motor 52 in accordance with a previously prepared operation program for motion error measurement to move and position the column 3, the saddle 4, and the table 6 at predetermined intervals in their respective feed-axis directions.

[Motion Error Calculator]

When the operation of moving and positioning the column 3, the saddle 4, and the table 6 at the predetermined intervals in their respective feed-axis directions in accordance with the operation program for motion error measurement is performed under control by the controller 75, the motion error calculator 70 calculates motion errors in the X-axis feed unit 10, the Y-axis feed unit 30, and the Z-axis feed unit 50 in the manner described below based on data detected by the read heads 18, 20, 22, and 24 of the X-axis feed unit 10, data detected by the read heads 38, 40, 42, and 44 of the Y-axis feed unit 30, and data detected by the read heads 58, 60, 62, and 64 of the Z-axis feed unit 50.

[Motion Errors in X-Axis Feed Unit]

The motion error calculator 70 calculates motion errors in the X-axis feed unit 10, for example, in the following manner:

Error $E_{XX}$ as a straight-line positioning error in the X-axis direction in the X-axis feed unit 10:

calculating, as the error $E_{XX}$, a mean value of differences between movement command values in the X-axis direction and movement values in the X-axis direction detected by the read heads 18, 20, 22, and 24;

Error $E_{YX}$ as a straightness error (in the Y-axis direction) in an X-axis and Y-axis plane in the X-axis feed unit 10:

calculating, as the error $E_{YX}$, any one of displacement amounts in the Y-axis direction detected by the read heads 18, 20, 22, and 24 or a mean value of the displacement amounts;

Error $E_{ZX}$ as a straightness error (in the Z-axis direction) in an X-axis and Z-axis plane in the X-axis feed unit 10:

calculating, as the error $E_{ZX}$, any one of displacement amounts in the Z-axis direction detected by the read heads 18, 20, 22, and 24 or a mean value of the displacement amounts;

Error $E_{AX}$ as an angular error around the X-axis in the X-axis feed unit 10:

calculating, as the error $E_{AX}$, a difference value between displacements in the Y-axis direction detected by the read heads 18 and 22 or the read heads 20 and 24;

Error $E_{BX}$ as an angular error around the Y-axis in the X-axis feed unit 10:

calculating, as the error $E_{BX}$, a difference value between positions in the X-axis direction detected by the read heads 18 and 22 or the read heads 20 and 24 or a difference value between displacements in the Z-axis direction detected by the read heads 18 and 20 or the read heads 22 and 24; and Error $E_{CX}$ as an angular error around the Z-axis in the X-axis feed unit 10:

calculating, as the error $E_{CX}$, a difference value between displacements in the Y-axis direction detected by the read heads 18 and 20 or the read heads 22 and 24.

[Motion Errors in Y-Axis Feed Unit]

The motion error calculator 70 calculates motion errors in the Y-axis feed unit 30, for example, in the following manner:

Error $E_{YY}$ as a straight-line positioning error in the Y-axis direction in the Y-axis feed unit 30:

calculating, as the error $E_{YY}$, a mean value of differences between movement command values in the Y-axis direction and movement values in the Y-axis direction detected by the read heads 38, 40, 42, and 44;

Error $E_{XY}$ as a straightness error (in the X-axis direction) in a Y-axis and X-axis plane in the Y-axis feed unit 30:

calculating, as the error $E_{XY}$, any one of displacement amounts in the X-axis direction detected by the read heads 38, 40, 42, and 44 or a mean value of the displacement amounts;

Error $E_{ZY}$ as a straightness error (in the Z-axis direction) in a Y-axis and Z-axis plane in the Y-axis feed unit 30:

calculating, as the error $E_{ZY}$, any one of displacement amounts in the Z-axis direction detected by the read heads 38, 40, 42, and 44 or a mean value of the displacement amounts;

Error $E_{AY}$ as an angular error around the X-axis in the Y-axis feed unit 30:

calculating, as the error $E_{AY}$, a difference value between displacements in the Z-axis direction detected by the read heads 38 and 40 or the read heads 42 and 44;

Error $E_{BY}$ as an angular error around the Y-axis in the Y-axis feed unit 30:

calculating, as the error $E_{BY}$, a difference value between displacements in the Z-axis direction detected by the read heads 38 and 42 or the read heads 40 and 44; and Error $E_{CY}$ as an angular error around the Z-axis in the Y-axis feed unit 30:

calculating, as the error $E_{CY}$, a difference value between positions in the Y-axis direction detected by the read heads 38 and 42 or the read heads 40 and 44 or a difference value between displacements in the X-axis direction detected by the read heads 38 and 40 or the read heads 42 and 44.

[Motion Errors in Z-Axis Feed Unit]

The motion error calculator 70 calculates motion errors in the Z-axis feed unit 50, for example, in the following manner:

Error $E_{ZZ}$ as a straight-line positioning error in the Z-axis direction in the Z-axis feed unit 50:

calculating, as the error $E_{ZZ}$, a mean value of differences between movement command values in the Z-axis direction and movement values in the Z-axis direction detected by the read heads 58, 60, 62, and 64;

Error $E_{XZ}$ as a straightness error (in the X-axis direction) in a Z-axis and X-axis plane in the Z-axis feed unit 50:

calculating, as the error $E_{XZ}$, any one of displacement amounts in the X-axis direction detected by the read heads 58, 60, 62, and 64 or a mean value of the displacement amounts;

Error $E_{YZ}$ as a straightness error (in the Y-axis direction) in a Z-axis and Y-axis plane in the Z-axis feed unit 50:

calculating, as the error $E_{YZ}$, any one of displacement amounts in the Y-axis direction detected by the read heads 58, 60, 62, and 64 or a mean value of the displacement amounts;

Error $E_{AZ}$ as an angular error around the X-axis in the Z-axis feed unit 50:

calculating, as the error $E_{AZ}$, a difference value between displacements in the Y-axis direction detected by the read heads 58 and 60 or the read heads 62 and 64;

Error $E_{BZ}$ as an angular error around the Y-axis in the Z-axis feed unit 50:

calculating, as the error $E_{BZ}$, a difference value between positions in the Z-axis direction detected by the read heads 58 and 62 or the read heads 60 and 64 or a difference value between displacements in the X-axis direction detected by the read heads 58 and 60 or the read heads 62 and 64; and Error $E_{CZ}$ as an angular error around the Z-axis in the Z-axis feed unit 50:

calculating, as the error $E_{CZ}$, a difference value between displacements in the Y-axis direction detected by the read heads 58 and 62 or the read heads 60 and 64.

[Output Unit]

The output unit 71 is composed of, for example, a display device such as a touch panel. The output unit 71 displays the motion errors in the X-axis feed unit 10, the Y-axis feed unit 30, and the Z-axis feed unit 50 calculated by the motion error calculator 70.

In the machine tool 1 according to this embodiment having the above-described configuration, the X-axis drive mechanism 11, the Y-axis drive mechanism 31, the Z-axis drive mechanism 51, and the spindle motor (not illustrated) are appropriately driven under control by the controller 75 so that the spindle 5 and the table 6 are appropriately moved relative to each other in the three-dimensional space. Through the relative movement, a workpiece placed on the table 6 is machined by a tool attached to the spindle 5.

Further, the previously prepared operation program for motion error measurement is executed under control by the controller 75 as necessary, so that the column 3, the saddle 4, and the table 6 are positioned at predetermined intervals in their respective feed-axis directions by the X-axis feed motor 12, the Y-axis feed motor 32, and the Z-axis feed motor 52.

In this process, the motion error calculator 70 calculates the above-described motion errors in the X-axis feed unit 10, the Y-axis feed unit 30, and the Z-axis feed unit 50 based on data detected by the read heads 18, 20, 22, and 24 of the X-axis feed unit 10, data detected by the read heads 38, 40, 42, and 44 of the Y-axis feed unit 30, and data detected by the read heads 58, 60, 62, and 64 of the Z-axis feed unit 50. The calculated motion errors are displayed on the output unit 71.

Thus, differently from the above-described conventional measurement, the machine tool 1 according to this embodiment measures the motion errors in the X-axis feed unit 10, the Y-axis feed unit 30, and the Z-axis feed unit 50 using the scales 15a, 15b, 16a, and 16b and read heads 18, 20, 22, and 24 already existing in the X-axis feed unit 10, the scales 35a, 35b, 36a, and 36b and read heads 38, 40, 42, and 44 already existing in the Y-axis feed unit 30, and the scales 55a, 55b, 56a, and 56b and read heads 58, 60, 62, and 64 already existing in the Z-axis feed unit 50 instead of using a laser length measurement device that is expensive. Therefore, the machine tool 1 achieves highly accurate measurement of the motion errors of the X-axis feed unit 10, Y-axis feed unit 30, and Z-axis feed unit 50 without extra costs and without requiring a complicated and burdensome preparing operation for the measurement.

Further, since the motion errors (i.e., motion performances) of the X-axis feed unit 10, Y-axis feed unit 30, and Z-axis feed unit 50 are easily detected, it is possible to evaluate the running performance of the machine tool 1, which changes with time, at an appropriate time without greatly reducing the availability of the machine tool 1. Consequently, it is possible to take a necessary action, such as performing needed maintenance on the machine tool 1, in advance in accordance with the evaluation results obtained.

Above has been described an embodiment of the present invention. However, the present invention is not limited to the above-described embodiment and can be implemented in other manners.

For example, the machine tool 1 in the above-described embodiment is a horizontal machining center; however, the present invention is not limited to a horizontal machining center. The present invention can be applied to any known machine tool, such as a vertical machining center, a horizontal lathe, or a vertical lathe.

Further, because of the configuration of the machine tool 1, the motion error calculator 70 in the above-described embodiment is configured to calculate the motion errors of three feed units, namely, the X-axis feed unit 10, the Y-axis feed unit 30, and the Z-axis feed unit 50; however, as a matter of course, the present invention is not limited to such a configuration. In the case where the machine tool includes a single feed unit, the motion error calculator 70 can be configured to calculate the motion error of the single feed unit. In the case where the machine tool includes two feed units or four or more feed units, the motion error calculator 70 can be configured to calculate the motion errors of these feed units.

Further, the read heads 18, 20, 22, and 24 in the X-axis feed unit 10 in the above-described embodiment are configured to each detect a position in the X-axis direction and displacement in the Y-axis direction and Z-axis direction; however, the present invention is not limited to this configuration.

For example, a configuration is possible in which: one of the two read heads arranged on at least one of the guide rails is configured to detect a position in the direction of a first axis as a feeding direction and a position in the direction of a second axis orthogonal to the first axis in a plane including the two guide rails; the other one of the two read heads is configured to detect a position in the direction of the first axis and a position in the direction of a third axis orthogonal to both the first axis and the second axis; and the two read heads arranged on the other one of the two guide rails are each configured to detect a position in the direction of the first axis and a position in the direction of the third axis. This configuration also enables calculation of the above-described six motion errors.

Further, a configuration is also possible in which: one of the two read heads arranged on at least one of the guide rails is configured to detect a position in the direction of a first axis as a feeding direction and a position in the direction of a second axis orthogonal to the first axis in a plane including the two guide rails; the other one of the two read heads is configured to detect a position in the direction of the first axis and a position in the direction of a third axis orthogonal to both the first axis and the second axis; and the two read heads arranged on the other one of the two guide rails are each configured to detect a position in the direction of the first axis and a position in the direction of the third axis. This configuration also enables calculation of the above-described six motion errors.

Further, the motion error calculator 70 in the above-described embodiment is configured to calculate the six motion errors in each feed unit; however, the present invention is not limited to such a configuration. For example, the motion error calculator 70 may be configured to calculate a positioning error (straight-line positioning accuracy) in the first-axis direction and at least one selected from among a straightness error (straightness) in the second-axis direction in a plane defined by the first axis and the second axis, a straightness error (straightness) in the third-axis direction in a plane defined by the first axis and the third axis, an angular error (roll) around the first axis, an angular error (pitch) around the second axis, and an angular error (yaw) around the third axis.

Furthermore, in such a case, it is not always necessary to provide each of the guide rails with scales for detecting positions in two axis directions. In such case, a configuration is possible in which each or either one of the guide rails is provided with only a scale necessary for the calculation of the errors. Accordingly, the sliders only need to be provided with a read head necessary for the calculation of the errors.

Further, the guide rails in the above-described embodiment are each provided with two sliders; however, the present invention is not limited to this configuration. The guide rails may be each provided with three or more sliders.

As already mentioned above, the foregoing description of the embodiments is not limitative but illustrative in all aspects. One skilled in the art would be able to make variations and modifications as appropriate. The scope of the invention is not defined by the above-described embodiments, but is defined by the appended claims. Further, the scope of the invention encompasses all modifications made from the embodiments within a scope equivalent to the scope of the claims.

REFERENCE SIGNS LIST

1 Machine tool
2 Bed
3 Column
4 Saddle
6 Table
10 X-axis feed unit
11 X-axis drive mechanism
15, 16 Guide rail
17, 19, 21, 23 Slider
18, 20, 22, 24 Read head
30 Y-axis feed unit
31 Y-axis drive mechanism
35, 36 Guide rail
37, 39, 41, 43 Slider
38, 40, 42, 44 Read head
50 Z-axis feed unit
51 Z-axis drive mechanism
55, 56 Guide rail
57, 59, 61, 63 Slider
58, 60, 62, 64 Read head
70 Motion error calculator
71 Output unit
75 Controller

The invention claimed is:

1. A feed apparatus comprising:
two guide rails arranged in parallel along a predetermined feeding direction;
at least four sliders arranged at least two by two on the two guide rails and engaged with the guide rails to be movable along the feeding direction;
a movable carriage mounted on the sliders and configured to be moved in the feeding direction; and
a drive mechanism configured to move the movable carriage in the feeding direction, wherein:
the feed apparatus includes:
a scale arranged along the feeding direction on at least one of the guide rails;
read heads respectively arranged on at least two sliders selected from the at least four sliders and engaged with the guide rail having the scale arranged thereon, the read heads being configured to detect a position in the feeding direction and a position in a direction orthogonal to the feeding direction by reading information given to the scale; and
a motion error calculator configured to calculate a motion error of the movable carriage based on position information in two directions detected by the read heads, wherein:

the scale is arranged on each of the two guide rails and the read heads are respectively arranged on the four sliders; and the motion error calculator is configured to calculate a motion error of the movable carriage based on position information in two directions detected by the four read heads.

2. The feed apparatus according to claim 1, wherein:

two read heads arranged on at least one of the guide rails are configured to detect a position in a direction of a first axis as the feeding direction and a position in a direction of a second axis orthogonal to the first axis in a plane including the two guide rails; and two read heads arranged on another one of the guide rails are configured to detect a position in the direction of the first axis and a position in a direction of a third axis orthogonal to both the first axis and the second axis.

3. The feed apparatus according to claim 1, wherein:

one of two read heads arranged on at least one of the guide rails is configured to detect a position in a direction of a first axis as the feeding direction and a position in a direction of a second axis orthogonal to the first axis in a plane including the two guide rails;

another one of the two read heads is configured to detect a position in the direction of the first axis and a position in a direction of a third axis orthogonal to both the first axis and the second axis; and two read heads arranged on another one of the guide rails are configured to detect a position in the direction of the first axis and a position in the direction of the third axis.

4. The feed apparatus according to claim 2, wherein the motion error calculator is configured to calculate a positioning error in the direction of the first axis and at least one selected from among a straightness error in the direction of the second axis in a plane defined by the first axis and the second axis, a straightness error in the direction of the third axis in a plane defined by the first axis and the third axis, an angular error around the first axis, an angular error around the second axis, and an angular error around the third axis.

5. A machine tool including the feed apparatus according to claim 1.

6. The feed apparatus according to claim 3, wherein the motion error calculator is configured to calculate a positioning error in the direction of the first axis and at least one selected from among a straightness error in the direction of the second axis in a plane defined by the first axis and the second axis, a straightness error in the direction of the third axis in a plane defined by the first axis and the third axis, an angular error around the first axis, an angular error around the second axis, and an angular error around the third axis.

7. A machine tool including the feed apparatus according to claim 2.

8. A machine tool including the feed apparatus according to claim 3.

9. A machine tool including the feed apparatus according to claim 4.

10. A machine tool including the feed apparatus according to claim 6.

* * * * *